T. CALLAN.
CONDENSER.
No. 49,855. Patented Sept. 12, 1865.
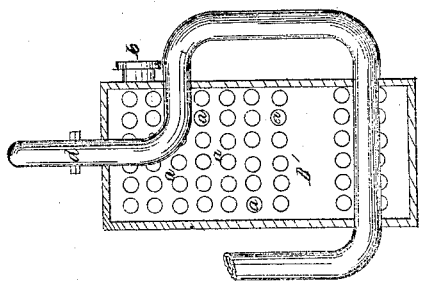
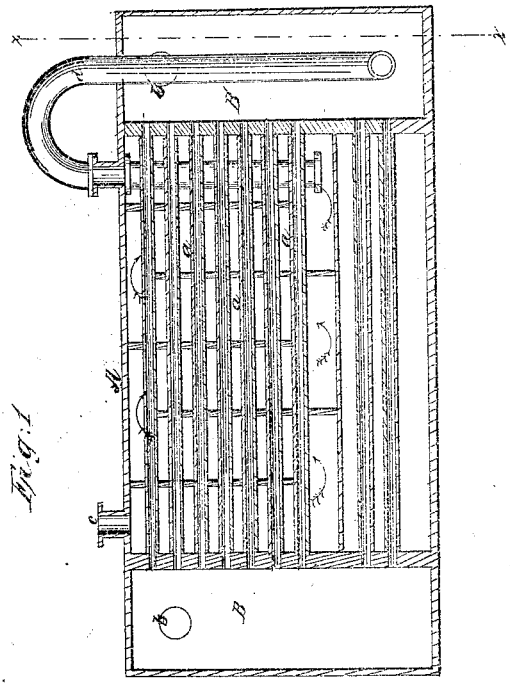
Witnesses:
Inventor:
Thos Callan

UNITED STATES PATENT OFFICE.

THOMAS CALLAN, OF PHILADELPHIA, PENNSYLVANIA.

IMPROVEMENT IN CONDENSERS.

Specification forming part of Letters Patent No. 49,855, dated September 12, 1865.

*To all whom it may concern:*

Be it known that I, THOMAS CALLAN, of Philadelphia, in the county of Philadelphia and State of Pennsylvania, have invented a new and Improved Fresh-Water Apparatus; and I do hereby declare that the following is a full, clear, and exact description thereof, which will enable others skilled in the art to make and use the same, reference being had to the accompanying drawings, forming part of this specification, in which—

Figure 1 represents a longitudinal vertical section of this invention. Fig. 2 is a transverse vertical section of the same, the line $x\,x$, Fig. 1, indicating the plane of section.

Similar letters of reference indicate like parts.

This invention relates to an improvement in that class of apparatus known as "Lighthall's Fresh-Water Apparatus," its object being to condense a sufficient quantity of steam to obtain water for injection which is free from all air and other impurities. In Lighthall's apparatus the exhaust-steam from the cylinder passes into a box which is filled with a large number of pipes terminating in chambers which communicate with an unlimited supply of cold water. (If used on board of a vessel said chambers communicate with the open sea.) By coming in contact with the cold surface of these pipes the steam is condensed and a sufficient quantity of pure water, free from air, is obtained for the injection. This water, however, is not cooled down to the desired degree of temperature unless the apparatus is made very long and extensive.

The improvement which forms the subject-matter of this present invention consists in passing the pipe which serves to draw the injection-water from the condensing-chamber through the chamber or chambers at one or both ends of the condensing-chamber, either in a direct or in a serpentine line or coil, in such a manner that the injection-water while passing through said chamber or chambers filled with cold water is cooled down several degrees without increasing the size or capacity of the condensing-chamber or without materially increasing the cost of the apparatus.

A represents the condensing-chamber, which is filled with a large number of pipes, $a$, terminating in chambers B B', as clearly shown in Fig. 1. The chambers B B' are situated close to the condensing-chamber and on opposite sides thereof, and they communicate through apertures $b\,b'$ with a tank or reservoir containing an unlimited supply of cold water, or if the apparatus is used on board of a vessel they communicate with the open sea, so that a continuous current of cold water passes through them and through the pipes $a$. The exhaust-steam from the steam-cylinder passes into the condensing-chamber through the pipe $c$, and by coming in contact with the cold surface of the pipes $a$ it is condensed. The water thus obtained is drawn off by means of the pipe $d$ and used for injection in the condenser. Ordinarily this pipe runs from the condensing-chamber A directly to the condenser, where the water is to be used for injection; but in my improved apparatus the pipe $d$ is caused to pass down through the chamber B' either in a straight line or in a zigzag course or coil, and, if desired, it may also be passed through the other chamber, B, and the condensed water is thereby cooled down several degrees before it is used for injection, without increasing the size or capacity of the condensing-chamber A.

The cost of the apparatus is but slightly increased by my improvement, and the injection-water is cooled down so as to produce a much more perfect vacuum than it does when taken directly from the condensing-chamber A.

What I claim as new, and desire to secure by Letters Patent, is—

Passing the pipe $d$, through which the condensed water is drawn off from the chamber A, through one or both cold-water chambers B B', substantially as and for the purpose set forth.

The above specification of my invention signed by me this 16th day of June, 1865.

THOS. CALLAN.

Witnesses:
M. M. LIVINGSTON,
C. L. TOPLIFF.